March 20, 1934.    R. C. GRASEBY    1,951,866
RELAY APPARATUS FOR USE IN ELECTRIC SUPPLY SYSTEMS
Filed April 12, 1930    2 Sheets-Sheet 1

Inventor,
Robert C. Graseby
Per,
Wm. L. Symons    Atty.

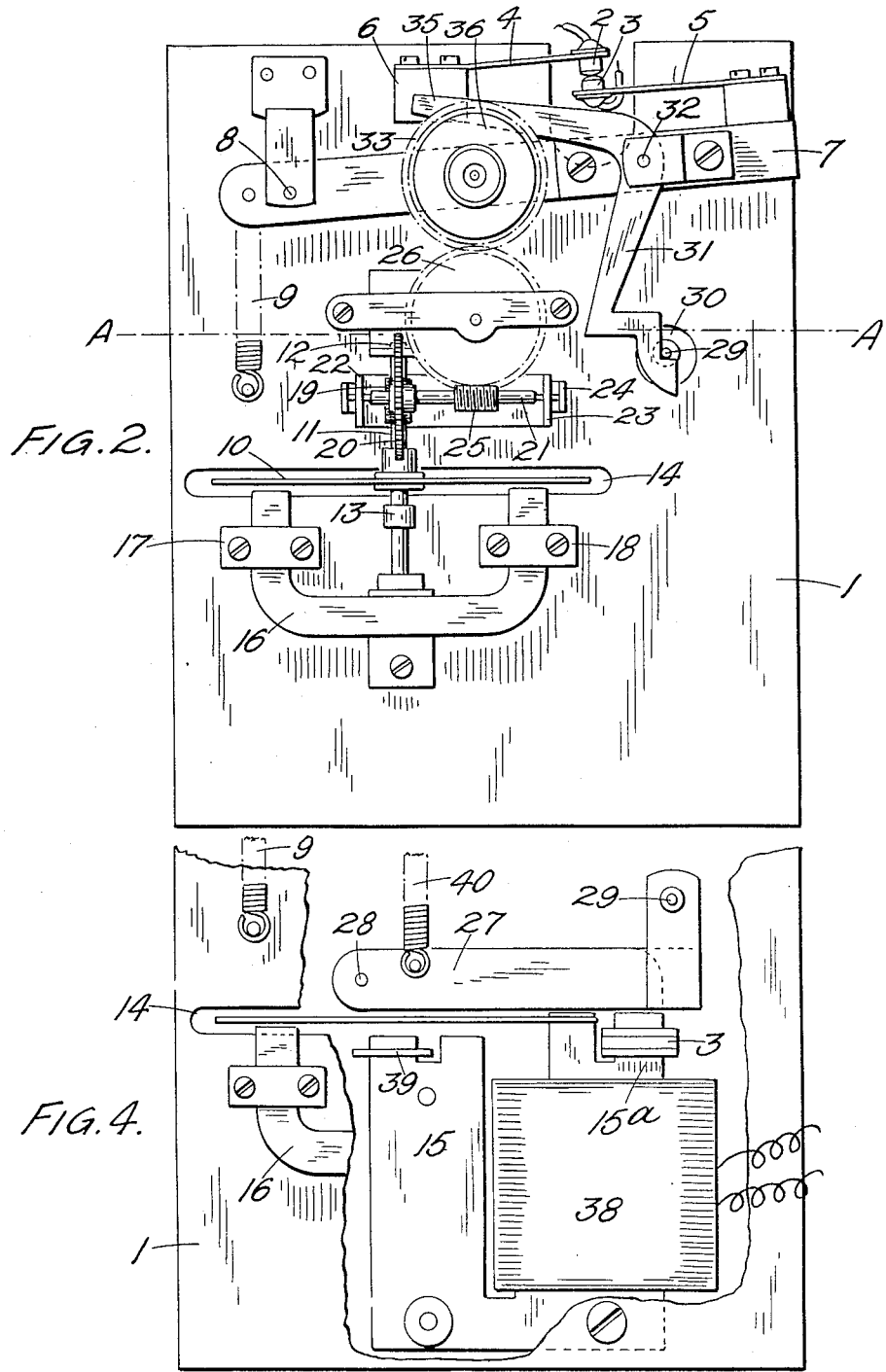

Patented Mar. 20, 1934

1,951,866

UNITED STATES PATENT OFFICE 1,951,866

RELAY APPARATUS FOR USE IN ELECTRIC SUPPLY SYSTEMS

Robert Constantine Graseby, Westminster, London, England

Application April 12, 1930, Serial No. 443,751
In Great Britain December 16, 1929

6 Claims. (Cl. 200—97)

This invention has as its object to provide relay apparatus for disconnecting apparatus from an electrical supply system on variation of the current flowing in a separate supply system and for reconnecting said apparatus after a predetermined time interval and without reference to the current then flowing in the separate supply system.

As a particular example, the invention has as its object to provide relay apparatus for disconnecting heating apparatus, for example, water heating apparatus, from an electric supply system at the commencement of the peak load on the supply system, which peak load usually commences when street lighting is switched on, and for reconnecting the heating apparatus after a predetermined time interval irrespective of whether the street lighting is still switched on or not. Thus for example, the street lighting may be switched on at the commencement of the peak load but will be continued after the peak load has passed, when the heating apparatus may be safely reconnected even while the street lighting system is still connected.

A further object of the invention is to provide setting means to control the predetermined time during which the apparatus is disconnected from the supply system.

One form of relay apparatus for disconnecting, for example, water heating apparatus from an electric supply system on the switching on of a street lighting service and which will reconnect the water heating apparatus to its supply after a predetermined time interval, will now be described with reference to the accompanying drawings wherein:—

Fig. 2 shows a front elevation,

Fig. 4 shows an elevation of the parts of the apparatus mounted at the back of the carrying plate.

Figure 1:
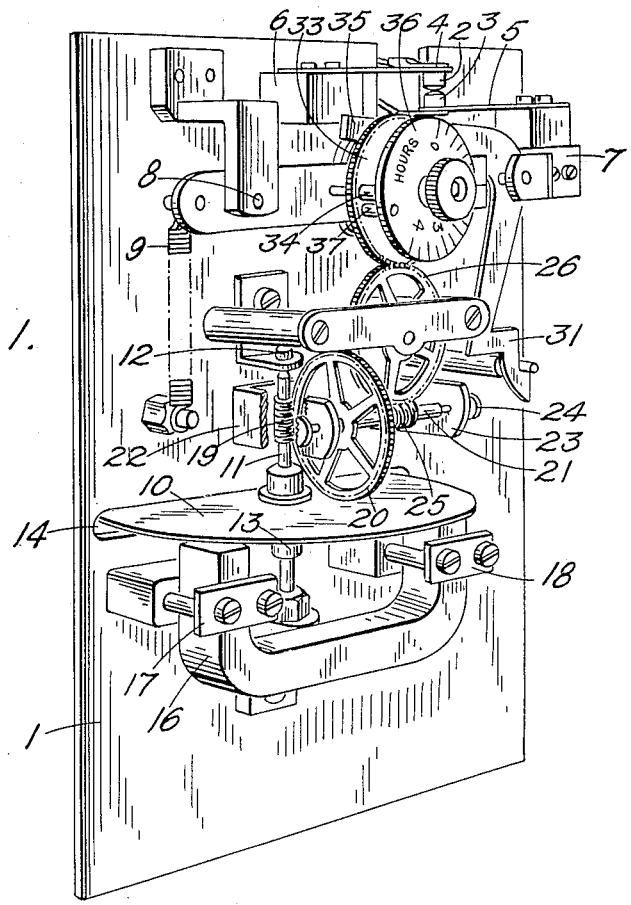
Fig. 1 shows a perspective view of the apparatus.
Figure 3:
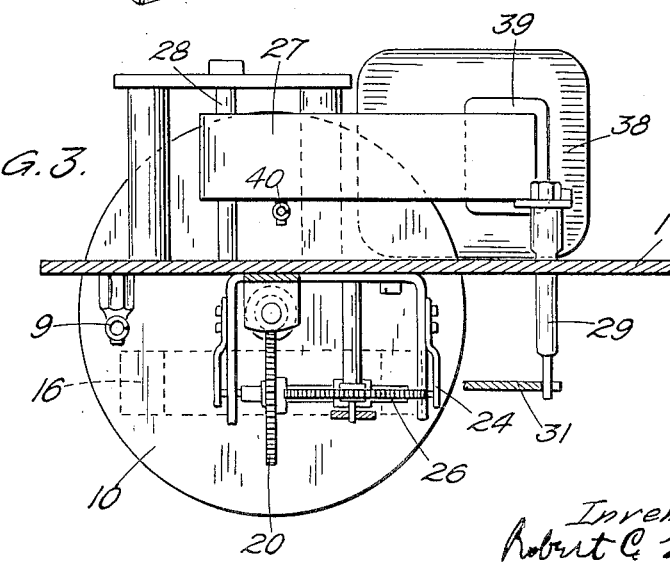
Fig. 3 shows a section on the line A—A of Fig. 2.

1 is a carrying plate on which the parts of the apparatus are mounted. The water heating apparatus is connected to its supply through a switch, the contacts 2, 3 of which are mounted at the ends of springs 4, 5 respectively. The contact 2 is relatively fixed in that the spring 4 carrying it is supported on a fixed block 6 mounted on the plate 1. The spring 5 carrying the other contact is mounted at one end of an arm 7 which is pivoted towards its other end at 8 on the plate 1. A spring 9 tends to maintain the arm in such position that the switch contacts 2, 3 are closed. The metal disc 10 of a Ferraris motor is mounted on a spindle 11 carried in bearings 12, 13 supported at the front of the plate 1. Said disc projects through a slot 14 in said plate over and close to the shaded pole 15 of a shaded pole electro-magnet which is connected to the street lighting supply system. A permanent magnet 16 to control the speed of the disc 10 is adjustably mounted in relation to the disc and on the front of the plate 1 by straps 17, 18. The spindle 11 carries a worm 19 which meshes with the gear wheel 20 carried on a horizontal spindle 21 supported in bearings 22, 23 so that it may have a slight longitudinal movement in said bearings against a flat spring 24. The spindle 21 carries a worm 25 which meshes with the gear wheel 26. 27 is the armature of the electro-magnet 15 and is pivoted at one end at 28 on the back of the plate 1. Said armature carries at its other end a pin 29 which projects through an opening 30 in the plate 1 to engage a trigger 31 of bell crank lever shape pivoted at 32 on the pivoted arm 7. Said arm also carries a pinion 33 which when the lever 7 is moved downwards will mesh with the pinion 26 driven by the disc 10. The pinion 33 carries a pin 34 which will be moved to engage the end 35 of the trigger. A setting plate 36 is mounted on the pivoted arm 7 co-axial with the pinion 33 and carries a pin or projection 37 with which the pin 34 on the pinion 33 will engage.

The electro-magnet 15 comprises a laminated iron core of usual form with a coil 38 on one or both limbs. Both poles 15 and 15a are slotted and carry shading rings 39. The disc 10 moves across the pole 15 and the armature 27 is pivoted at a point adjacent said pole so that when the armature moves about its pivot 28 the gap in which the disc 10 moves is maintained substantially constant. At the same time the shading of the pole 15a towards which the opposite end of the armature 27 moves prevents noise and chattering of the armature. The armature is moved away from the core by a spring 40.

The operation of the apparatus will now be described.

Assume that the switch contacts 2, 3 are closed. At a certain instant the street lighting supply is switched on, whereupon the armature 27 is attracted to the electromagnet 15, 15a and through its projecting pin 29 and the trigger 31 the pivoted arm 7 is moved against its spring 9 to open the contacts 2, 3 of the switch and thus disconnect the water heating apparatus from its supply. This operation causes the pinion 33 to mesh with the pinion 26 driven by the disc 10. At the same time said disc 10 commences to rotate and consequently drives the pinion 33 until the pin 34 which it carries engages the trigger 31 and moves it to disconnect it from the pin 29 carried on the armature 27, thus allowing the pivoted arm 7 to move under the action of its spring 9 and close the switch contacts 2, 3 of the water heating apparatus. When this happens the pinion 33 is disconnected from the pinion 26 and under the action of gravity or a spring returns to a position in which its pin 34 engages the pin 37 on the setting plate 36. The position of the setting plate controls the point of commencement of the movement of the pinion 33 and thus the time during which the switch 2, 3 is open. The setting plate 36 has a time scale engraved on it. On the street lighting supply being switched off the armature 27 moves about its pivot and the pin 29 engages the end of the trigger 31 so that the apparatus is in a position to operate again on switching on the street lighting system.

When the pinion 33 is moved to engage the pinion 26, the positions may be such that satisfactory meshing does not occur. In these circumstances the pinion 26 is rotated by the pressure between the two pinions until meshing will occur and such rotation is permitted by the spindle 21 moving longitudinally in its bearings against the spring 24.

Instead of the switch 2, 3 being connected in the circuit of the water heating apparatus it may be connected in the circuit of a relay to control the connection of said apparatus to its supply. In such a case the switch 2, 3 is arranged to be closed on increase of the current in the separate supply system.

What I claim is:—

1. A relay apparatus comprising in combination a switch controlling the connection of apparatus to an electrical supply system, electro-magnetic means connected to a separate supply system, a mechanical connection between said means and switch for the actuation of the latter by the former in one sense on variation of the current in the separate supply system, a releasable element in said mechanical connection, motor means driven by the current in the separate supply system and trip mechanism operated from the motor means for engaging and causing the release of the releasable element of the mechanical connection for the actuation of the switch in the opposite sense.

2. A relay apparatus comprising in combination a switch controlling the connection of apparatus to an electrical supply system, electro-magnetic means connected to a separate supply system, a pivoted arm carrying one contact of the switch, a trigger pivoted on said arm and operative upon a releasable mechanical connection between said arm and the electro-magnetic means, motor means driven by the current in the separate supply system, and a pinion mounted on said arm and positioned to be caused to mesh with gearing driven from the motor means when the arm is moved by the electro-magnetic means to operate the switch in one sense, said pinion carrying a stop which will engage the trigger to release the aforesaid mechanical connection for operation of the switch in the opposite sense.

3. A relay apparatus comprising in combination a switch controlling the connection of apparatus to an electrical supply system, electro-magnetic means connected to a separate supply system, a releasable mechanical connection between said means and switch allowing of the actuation of the latter by the former in one sense on variation of the current in the separate supply system, motor means driven by the current in the separate supply system, trip mechanism operated from the motor means to release said mechanical connection for the actuation of the switch in the opposite sense, and setting means to control the period of operation of said motor means before said trip mechanism is operated.

4. Relay apparatus according to claim 6 in combination with setting mechanism comprising a pin extending from a disc adjustably mounted on the pivoted arm for engagement by the stop on the pinion in the zero position from which the pinion commences to be driven, adjustment of said position by said stop serving to determine the period of operation of the motor means before the trigger is engaged by the stop.

5. Relay apparatus according to claim 2 wherein a gear member of the gearing driven by the motor means and engageable by the pinion mounted on the pivoted arm is movable axially for the purpose of facilitating such engagement, and is carried on a spindle which is movable longitudinally against a spring.

6. A relay apparatus comprising in combination, a switch controlling the connection of apparatus to an electrical supply system, an electro-magnet connected to a separate supply system, a linkage mechanically connecting said magnet and switch in such manner as to permit of actuation of the switch in one sense on variation of the current in the separate supply system and in the magnet, a disconnectable link in said linkage, a motor energized by the current in the separate supply system, a rotary trip device engageable with the disconnectable link, a releasable driving connection between said trip device and the motor and an operative connection between said trip device and the linkage whereby said driving connection is established on the aforesaid actuation of the switch in the one sense and the trip device is thereafter driven until it engages the disconnectable link and releases the mechanical connection between the magnet and switch to permit of actuation of the switch in the other sense.

ROBERT CONSTANTINE GRASEBY.